(12) United States Patent
Yoo et al.

(10) Patent No.: US 11,742,882 B2
(45) Date of Patent: Aug. 29, 2023

(54) ELECTRONIC DEVICE FOR DIRECT OR INDIRECT WIRELESS COMMUNICATION BETWEEN DEVICES

(71) Applicant: Samsung Electronics Co., Ltd., Gyeonggi-do (KR)

(72) Inventors: Jonghun Yoo, Gyeonggi-do (KR); Dongil Yang, Gyeonggi-do (KR); Hyoseok Na, Gyeonggi-do (KR); John Moon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 19 days.

(21) Appl. No.: 17/583,912

(22) Filed: Jan. 25, 2022

(65) Prior Publication Data

US 2022/0149873 A1    May 12, 2022

Related U.S. Application Data

(63) Continuation of application No. PCT/KR2020/004541, filed on Apr. 3, 2020.

(30) Foreign Application Priority Data

Jul. 31, 2019    (KR) .................. 10-2019-0093397

(51) Int. Cl.
*H04B 1/00*    (2006.01)
*H04B 1/16*    (2006.01)
*H04L 5/14*    (2006.01)

(52) U.S. Cl.
CPC ......... *H04B 1/0064* (2013.01); *H04B 1/0067* (2013.01); *H04B 1/1615* (2013.01); *H04L 5/14* (2013.01)

(58) Field of Classification Search
CPC .. H04B 1/0064; H04B 1/0067; H04B 1/1615; H04B 1/48; H04L 5/14
See application file for complete search history.

(56) References Cited

U.S. PATENT DOCUMENTS 9,515,695 B2    12/2016   Bagger
9,948,406 B2    4/2018    Lim et al.
(Continued)

FOREIGN PATENT DOCUMENTS

KR    10-2015-0095112    8/2015
KR    10-2017-0002625    1/2017
(Continued)

OTHER PUBLICATIONS

PCT/ISA/210 Search Report issued on PCT/KR2020/004541, dated Jul. 13, 2020, pp. 5.
(Continued)

*Primary Examiner* — Nguyen T Vo
(74) *Attorney, Agent, or Firm* — The Farrell Law Firm, P.C.

(57) ABSTRACT

An electronic device is provided and includes an antenna; a first duplexer including a first band pass filter (BPF), a second BPF, a first port, a second port, and a third port; a filter; a power amplification circuit including an input port and an output port; a processor; a radio frequency (RF) integrated circuit (RFIC) including an input port and an output port; a first switch including a first terminal and a second terminal; a second switch including a first terminal and a second terminal; and a third switch including a first terminal, wherein the processor is configured to connect the antenna to the first terminal of the first switch, the output port of the power amplification circuit to the first terminal of the second switch, and a second port of the filter to the first terminal of the third switch by controlling the first switch, the second switch, and the third switch, and output a baseband signal to the RFIC in a state in which the antenna is connected to the first terminal of the first switch, the output port of the power amplification circuit is connected to the first terminal of the second switch, and the second port (Continued)

of the filter is connected to the first terminal of the third switch.

20 Claims, 6 Drawing Sheets

(56) References Cited

U.S. PATENT DOCUMENTS

| | | | |
|---|---|---|---|
| 9,998,153 B2 | 6/2018 | Balm et al. | |
| 10,128,872 B2 | 11/2018 | Langer et al. | |
| 10,141,957 B2 | 11/2018 | Khlat et al. | |
| 2007/0042802 A1* | 2/2007 | Park | H04B 1/006 |
| | | | 455/552.1 |
| 2013/0273859 A1 | 10/2013 | King et al. | |
| 2015/0230258 A1 | 8/2015 | Kwon et al. | |
| 2017/0063595 A1 | 3/2017 | Ma et al. | |
| 2018/0241369 A1 | 8/2018 | Ghim et al. | |
| 2021/0091832 A1* | 3/2021 | Obiya | H04B 1/0057 |
| 2021/0409046 A1* | 12/2021 | Yamaguchi | H04B 1/18 |

FOREIGN PATENT DOCUMENTS

| | | |
|---|---|---|
| KR | 10-1763997 | 8/2017 |
| KR | 10-2018-0096385 | 8/2018 |

OTHER PUBLICATIONS

PCT/ISA/237 Written Opinion issued on PCT/KR2020/004541, dated Jul. 13, 2020, pp. 4.

* cited by examiner

ELECTRONIC DEVICE FOR DIRECT OR INDIRECT WIRELESS COMMUNICATION BETWEEN DEVICES

CROSS-REFERENCE TO RELATED APPLICATION(S)

This application is a bypass continuation application of PCT International Application No. PCT/KR/2020/004541, which was flied on Apr. 3, 2020, in the Korean Intellectual Property Office, and claims priority to Korean Patent Application No. 10-2019-0093397, which was filed on Jul. 31, 2019, in the Korean Intellectual Property Office, the entire content of each of which is incorporated herein by reference.

BACKGROUND

1. Field

The disclosure relates generally to an electronic device configured to perform direct communication with another electronic device without relay by a base station.

2. Description of Related Art

Device to device (D2D) communication refers to direct communication between electronic devices without any assistance of radio relay equipment (e.g., a base station) therebetween. An electronic device may perform direct communication with another electronic device through a long term evolution (LTE) communication scheme.

An electronic device may include an antenna, a radio frequency integrated circuit (RFIC), and a duplexer as elements for D2D communication. The duplexer divides a transmitted signal and a received signal having different frequency bands and, for example, may be inserted into a path connecting the antenna and the RFIC.

However, insertion loss (IL) of the duplexer is high at, for example, a maximum of 3 decibels (dB), and thus output power loss of the transmitted signal may occur. The power loss may be a problem of D2D communication since a distance at which devices may perform transmission and reception should be short.

SUMMARY

The present disclosure has been made to address the above-mentioned problems and disadvantages, and to provide at least the advantages described below.

According to an aspect of the present disclosure, an electronic device includes an antenna; a first duplexer comprising a first band pass filter (BPF) configured to pass a radio frequency (RF) signal having a frequency band belonging to a first frequency band, a second BPF configured to pass an RF signal having a frequency band belonging to a second frequency band, a first port configured between the first BPF of the first duplexer and the second BPF of the first duplexer, a second port connected to the first BPF of the first duplexer, and a third port connected to the second BPF of the first duplexer; a filter configured to pass an RF signal in a frequency band including a frequency band of an RF signal passing through at least one of the first BPF of the first duplexer or the second BPF of the first duplexer; a power amplification circuit comprising an input port configured to receive an RF signal and an output port configured to output an amplified RF signal; a processor; an RF integrated circuit (RFIC) comprising an input port configured to convert a baseband signal received from the processor into an RF signal, convert an RF signal received through the antenna into a baseband signal, and receive an RF signal, and an output port configured to output an RF signal; a first switch comprising a first terminal connected to a first port of the filter and a second terminal connected to the first port of the first duplexer and configured to connect the antenna to the first terminal of the first switch or the second terminal of the first switch; a second switch comprising a first terminal and a second terminal connected to the second port of the first duplexer and configured to connect the output port of the power amplification circuit to the first terminal of the second switch or the second terminal of the second switch; and a third switch comprising a first terminal connected to the first terminal of the second switch and a second terminal connected to the input port of the RFIC and configured to connect the second port of the filter to the first terminal of the third switch or the second terminal of the third switch, wherein the processor is configured to connect the antenna to the first terminal of the first switch, the output port of the power amplification circuit to the first terminal of the second switch, and the second port of the filter to the first terminal of the third switch by controlling the first switch, the second switch, and the third switch, and output a baseband signal to the RFIC in a state in which the antenna is connected to the first terminal of the first switch, the output port of the power amplification circuit is connected to the first terminal of the second switch, and the second port of the filter is connected to the first terminal of the third switch.

According to another aspect of the present disclosure, an electronic device includes a first duplexer comprising a first BPF configured to pass an RF signal having a frequency band belonging to a first frequency band, a second BPF configured to pass an RF signal having a frequency band belonging to a second frequency band, a first port configured between the first BPF of the first duplexer and the second BPF of the first duplexer, a second port connected to the first BPF of the first duplexer, and a third port connected to the second BPF of the first duplexer; a filter configured to pass an RF signal in a frequency band including a frequency band of an RF signal passing through at least one of the first BPF of the first duplexer or the second BPF of the first duplexer; an antenna connected to a first port of the filter; a power amplification circuit comprising an input port configured to receive an RF signal and an output port configured to output an amplified RF signal; a processor; an RFIC comprising an input port configured to convert a baseband signal received from the processor into an RF signal, convert an RF signal received through the antenna into a baseband signal, and receive an RF signal, and an output port configured to output an RF signal; a first switch comprising a first terminal and a second terminal connected to the first port of the first duplexer and configured to connect a second port of the filter to the first terminal of the first switch or the second terminal of the first switch; second switch comprising a first terminal and a second terminal connected to the second port of the first duplexer and configured to connect the output port of the power amplification circuit to the first terminal of the second switch or the second terminal of the second switch; and a third switch comprising a first terminal connected to the first terminal of the second switch and a second terminal connected to the input port of the RFIC and configured to connect the first terminal of the first switch to the first terminal of the third switch or the second terminal of the third switch, wherein the processor is configured to connect the second port of the filter to the first terminal of the first switch, the output port of the power amplification circuit to the first terminal of the second switch, and the first terminal of the first switch to the first terminal of the third switch by controlling the first switch, the second switch, and the third switch, and output a baseband signal to the RFIC in a state in which the second port of the filter is connected to the first terminal of the first switch, the output port of the power amplification circuit is connected to the first terminal of the second switch, and the first terminal of the first switch is connected to the first terminal of the third switch.

According to another aspect of the present disclosure, an electronic device includes a diplexer comprising a low pass filter (LPF), a high pass filter (HPF), a first port configured between the LPF and the HPF, a second port connected to the LPF, and a third port connected to the HPF; an antenna connected to the first port of the diplexer; a filter configured to pass an RF signal in a frequency band including a frequency band of an RF signal passing through the LPF; a first duplexer comprising a first BPF configured to pass an RF signal having a frequency band belonging to a first frequency band, a second BPF configured to pass an RF signal having a frequency band belonging to a second frequency band, a first port configured between the first BPF of the first duplexer and the second BPF of the first duplexer, a second port connected to the first BPF of the first duplexer, and a third port connected to the second BPF of the first duplexer; a power amplification circuit comprising an input port configured to receive an RF signal and an output port configured to output an amplified RF signal; a processor; an RFIC comprising an input port configured to convert a baseband signal received from the processor into an RF signal, convert an RF signal received through the antenna into a baseband and receive an RF signal, and an output port configured to output an RF signal; a first switch comprising a first terminal connected to a first port of the filter and a second terminal connected to the first port of the first duplexer and configured to connect the second port of the diplexer to the first terminal of the first switch or the second terminal of the first switch; a second switch comprising a first terminal and a second terminal connected to the second port of the first duplexer and configured to connect the output port of the power amplification circuit to the first terminal of the second switch or the second terminal of the second switch; and a third switch comprising a first terminal connected to the first terminal of the second switch and a second terminal connected to the input port of the RFIC and configured to connect a second port of the filter to the first terminal of the third switch or the second terminal of the third switch, wherein the processor is configured to connect the second port of the diplexer to the first terminal of the first switch, the second port of the filter to the first terminal of the third switch, and the output port of the power amplification circuit to the first terminal of the second switch by controlling the first switch, the second switch, and the third switch, and output a baseband signal to the RFIC in a state in which the second port of the diplexer is connected to the first terminal of the first switch, the second port of the filter is connected to the first terminal of the third switch, and the output port of the power amplification circuit is connected to the first terminal of the second switch.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Various embodiments of the disclosure may provide an electronic device for expanding a transmission/reception distance and increasing communication efficiency by minimizing output power loss of a transmitted signal during D2D communication.

According to various embodiments, an electronic device can minimize output power loss of an RF signal and expand a distance for direct communication by configuring a path to output the RF signal to an antenna through a filter (for example, an LPF), which is not the duplexer and has a lower IL than the duplexer, during D2D communication.

Figure 1:
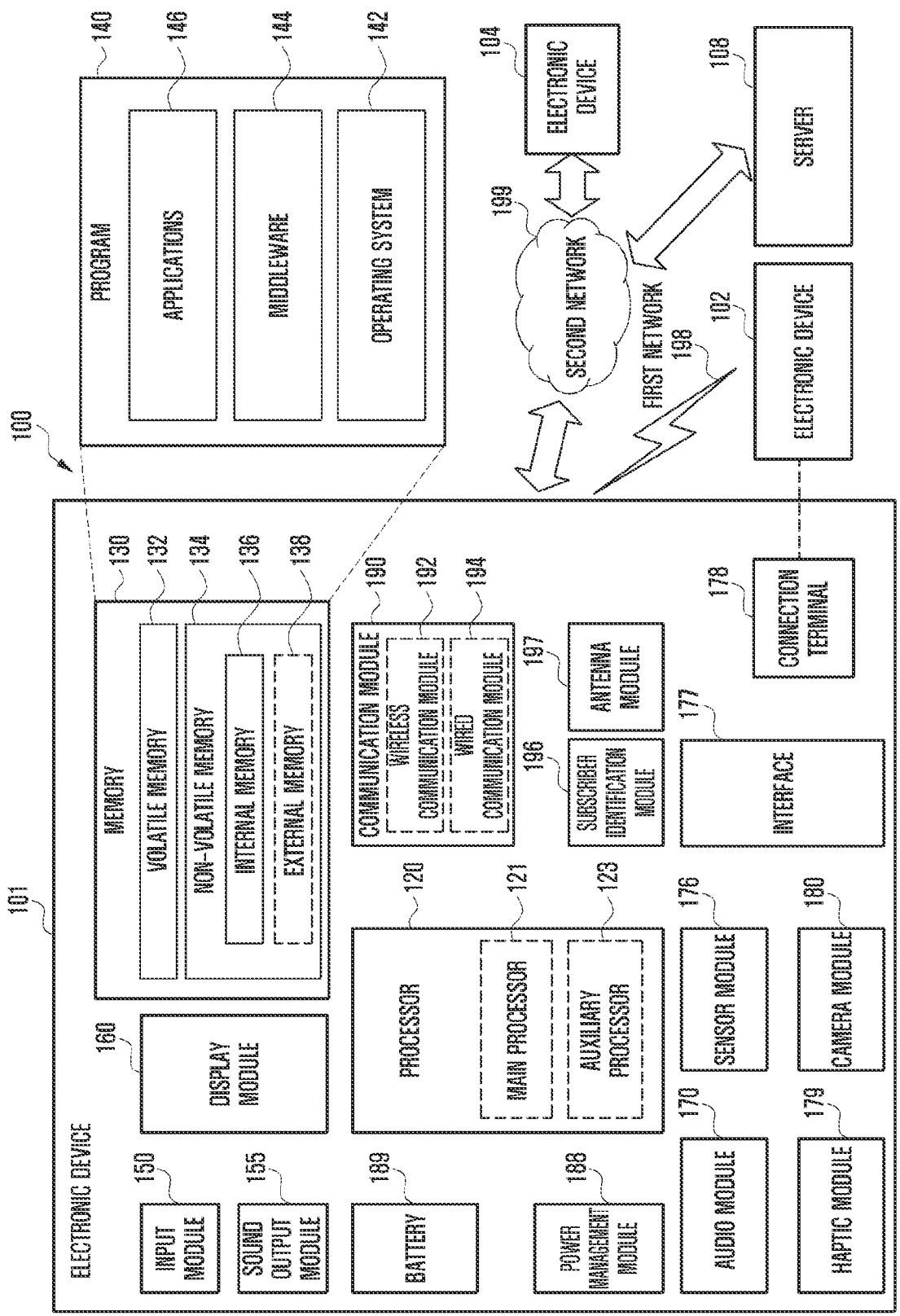
FIG. 1 illustrates an electronic device within a network environment, according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)).

These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (PASO) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit hoard (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., an RFIC) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment, With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
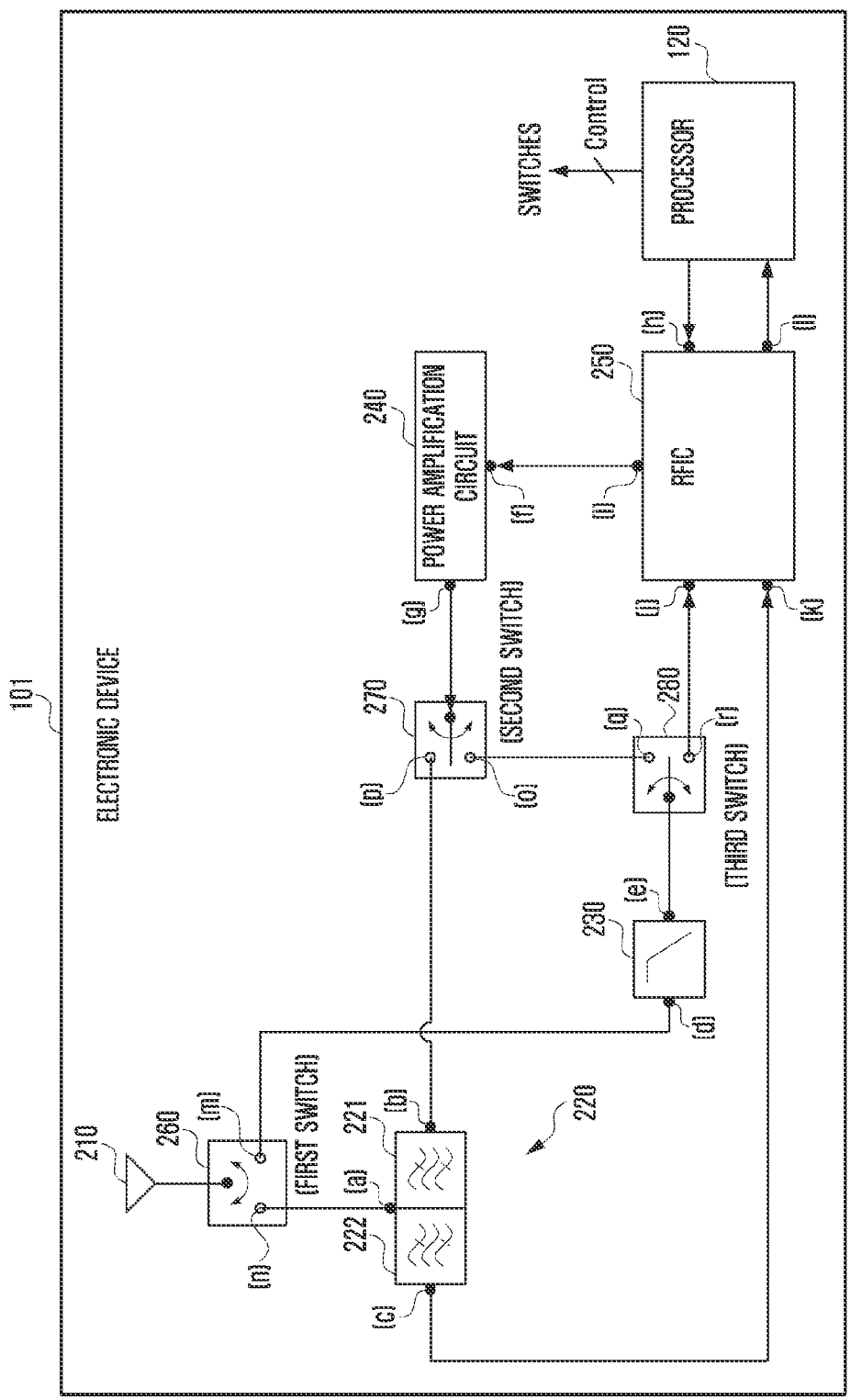
FIG. 2 illustrates an electronic device configured to support D2D communication, according to an embodiment.

FIG. 2 illustrates an electronic device configured to support D2D communication, according to an embodiment.

Referring to FIG. 2, the electronic device 101 includes an antenna 210, a first duplexer 220 including a first BPF 221 and a second BPF 222, a filter 230, a power amplification circuit 240, a processor 120, an RFIC 250, a first switch 260, a second switch 270, and a third switch 280. The antenna 210 may be an element for configuring an antenna module 197. The RFIC 250 may be an element (for example, a wireless communication circuit supporting communication with a cellular network (for example, an LTE network) for configuring the wireless communication module 192. The second switch 270 and the power amplification circuit 240 may be configured as one module. For example, the second switch 270 and the power amplification circuit 240 may be integrated into a single device.

The first duplexer 220 may include a BPF 221 for passing an RF signal in a first frequency band, a BPF 222 for passing an RF signal in a second frequency band, a port (a) configured between the BPF 221 and the BPF 222, a port (b) connected to the BPF 221, and a port (c) connected to the BPF 222. The BPF 221 may be configured to filter an RF signal having a first frequency band from a signal received through one of the port (a) and the port (b) and output the filtered signal to another port. The BPF 222 may be configured to filter an RF signal having a second frequency band from a signal received through one of the port (a) and the port (c) and output the filtered signal to another port. In various embodiments, the first frequency band may be a frequency band allocated to the uplink of B13, B14, B20, or B28 among LTE frequency bands designated to a frequency division duplexing (FDD) communication scheme.

The BPF 221 may include a surface acoustic wave (SAW) filter configured to pass an RF signal in a frequency band (about 703 to 748 megahertz (MHz)) allocated to, for example, the uplink of B28 among the LTE frequency bands designated to the FDD communication scheme. The BPF 222 may include a SAW filter configured to pass an RF signal in a frequency band (about 759 to 803 MHz) allocated to the downlink of B28.

The filter 230 may be disposed on a path connecting the first switch 260 and the third switch 280 and may include a first port (d) and a second port (e). The first port (d) may be configured to be connected to the first switch 260 and the second port (e) may be configured to be connected to the third switch 280. The filter 230 may filter an RF signal having a predetermined frequency band from a signal received through one of the first port (d) and the second port (e) and output the filtered signal to another port. The filter 230 may be configured to pass an RF signal in a frequency band including a frequency band of an RF signal passing through the first duplexer 220.

The filter 230 may include a filter an LPF when the first duplexer 220 includes SAW filters) generating an IL lower than an IL generated when the first duplexer 220 is inserted into the path connecting the antenna 210 and the RFIC 250. For example, the filter 230 may include an LC filter including an inductor (L) and a capacitor (C) to have a characteristic for passing an RF signal in a low frequency band (for example, about 698 to 960 MHz) including the first frequency band. The RF signal passing through the LC filter may have an IL improved by about 2.14 dB compared to the RF signal passing through the SAW filter. Accordingly, the RF signal passing through the filter 230 may have a smaller loss than the RF signal passing through the first duplexer 220, and an RF signal with higher power may be output through the antenna 210. An increase in the signal transmission distance may increase a possibility of the use of a service using D2D communication (for example, an emergency disaster notification service or a unidirectional communication service such as a radio set).

The power amplification circuit 240 may be disposed on a path connecting the second. switch 270 and the RFIC 250 and may include an input port (f) and an output port (g). The input port (f) may be configured to be connected to the RFIC 250 and the output port (h) may be configured to be connected to the second switch 270, The power amplification circuit 240 may receive an RF signal from the KM 250 through the input port (f), amplify the received RF signal, and output the amplified RF signal to the second switch 270 through the output port (g).

The RFIC 250 may include a first input port (h) for receiving a signal in a baseband and a first output port (i) for outputting an RF signal. The RFIC 250 may be configured to convert the signal in the baseband received from the processor 120 through the first input port (h) into the RF signal in the first frequency band and output the RF signal to the power amplification circuit 240 through the first output port (i). The RFIC 250 may include a second set of input ports (j) and (k) for receiving an RF signal and a second output port (1) for outputting a signal in a baseband. A connection from the second set of input ports (j) and (k) to an input port (j) may be connected via the third switch 280, and an input port (k) may be connected to the port (c) of the first duplexer 220. The RFIC 250 may receive the RF signal in the first frequency band through the input port (j) and the RF signal in the second frequency band through the input port (k). The RFIC 250 may be configured to amplify the received RF signal through, a low noise amplifier (LNA), convert the amplified RF signal into a baseband signal, and output the baseband signal to the processor 120 through the second output port (1).

The first switch 260 may include a terminal (m) connected to the first port (d) of the filter 230 and a terminal (n) connected to the port (a) of the first duplexer 220. The first switch 260 may be configured to connect the antenna 210 to the terminal (in) or the terminal (n).

The second switch 270 may include a terminal (o) and a terminal (p) connected to the port (h) of the first duplexer

220. The second switch 270 may be configured to connect the output port (g) of the power amplification circuit 240 to the terminal (o) or the terminal (p).

The third switch 280 may include a terminal (q) connected to the terminal (o) and a terminal (r) connected to the input port (j) of the RFIC 250. The third switch 280 may be configured to connect the second port (e) of the filter 230 to the terminal (q) or the terminal (r).

The processor 120 (for example, an AP and/or a CP) may be configured to control the first switch 260, the second switch 270, and the third switch 280. The processor 120 may acquire information on network coverage (for example, a cellular network of an UTE network) in which the electronic device 101 is located from the baseband signal received from the RFIC 250. The processor 120 may not acquire coverage information when the connection with the network is disconnected. Accordingly, the processor 120 may control the switches 260, 270, and 280 to connect the antenna 210 to the terminal (m), connect the output port (g) of the power amplification circuit 240 to the terminal (o), and connect the second port (e) of the filter 230 to the terminal (q). In such a connected state (hereinafter, referred to as a D2D transmission mode), the processor 120 may be configured to output a baseband signal (for example, including coverage information acquired before the disconnection) to the RFIC 250, in the D2D transmission mode, the baseband signal may be converted into the RF signal in the first frequency band by the RFIC 250, and the RF signal may be amplified through the power amplification circuit 240, and the amplification RF signal may be transmitted to the antenna 210 through the filter 230 rather than through the first duplexer 220. The RF signal radiated through the antenna 210 may be directly transmitted to an external electronic device (for example, the electronic device 102) without passing through the network.

The processor 120 may switch the D2D communication mode for direct communication with the external electronic device from a D2D transmission mode to a D2D reception mode. For example, when a predetermined time passes after the D2D transmission mode starts and a user input is received through the input device 150 during the D2D transmission mode after the signal is transmitted through the antenna 210 a predetermined number of times in the D2D transmission mode, the processor 120 may connect the second port (e) of the filter 230 to the terminal (r) while maintaining the connection between the antenna 210 and the terminal (m). In the D2D reception mode, the signal received from the outside through the antenna 210 may be transmitted to the RFIC 250 through the filter 230, and a frequency band thereof may be converted into a baseband by the RFIC 250 and transmitted to the processor 120.

Figure 3:
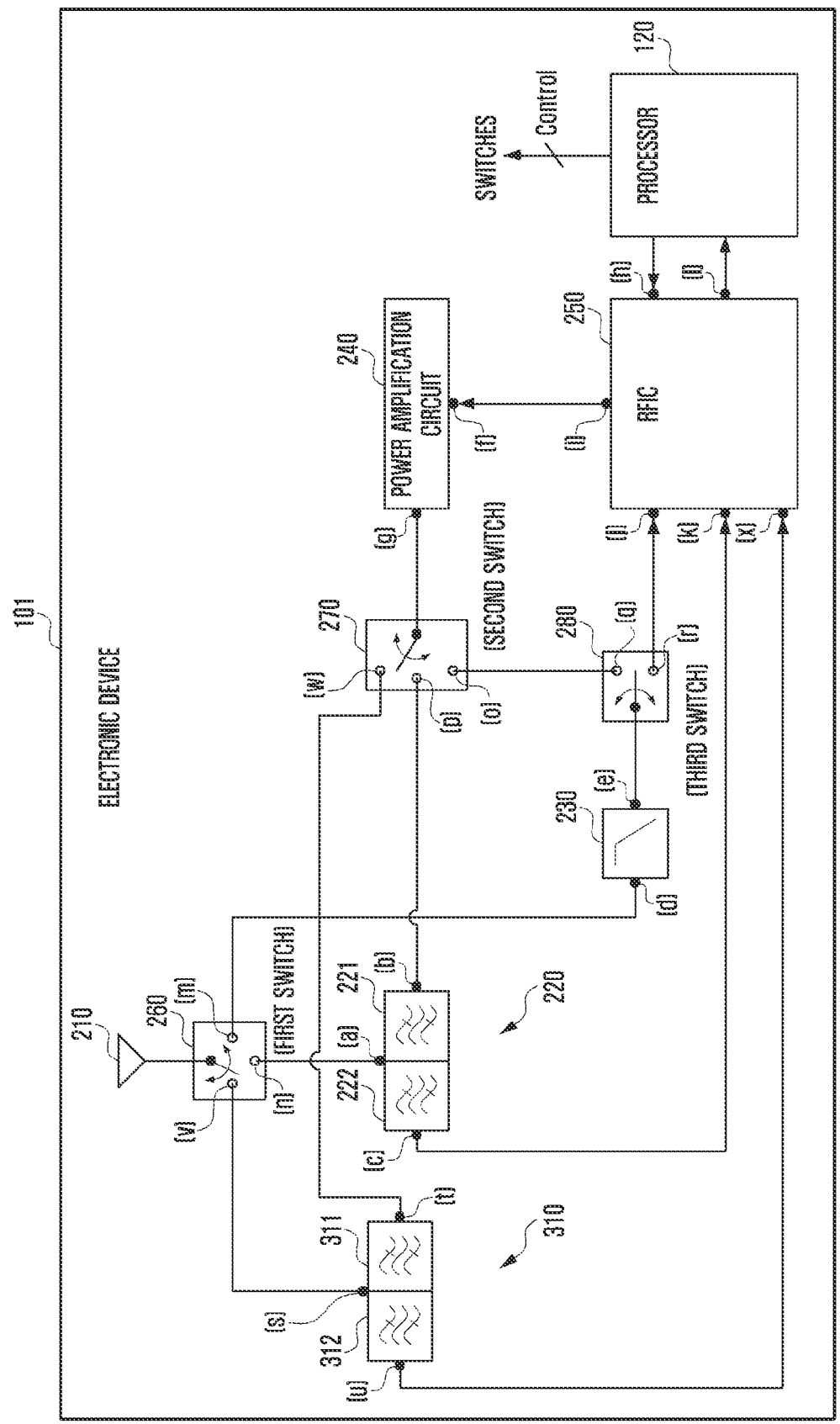
FIG. 3 illustrates an electronic device configured to support D2D communication, according to an embodiment.

FIG. 3 illustrates an electronic device configured to support D2D communication, according to an embodiment. For convenience of description, elements which overlap those in FIG. 2 are omitted or are briefly described.

Referring, to FIG. 3, the electronic device 101 further includes a second duplexer 310. The second duplexer 310 may include a BPF 311 for passing an RF signal in a third frequency band, a BPF 312 for passing an RF signal in a fourth frequency band, a port (s) configured between the BPF 311 and the BPF 312, a port (t) connected to the BPF 311, and a port (u) connected to the BPF 312. The BPF 311 may be configured to filter an RF signal having a third frequency band from a signal received through one of the port (s) and the port (t) and output the filtered signal to another port. The BPF 312 may be configured to filter art RF signal having a fourth frequency band from an signal received through one of the port (s) and the port (u) and output the filtered signal to another port.

The BPF 311 may include a SAW filter configured to pass, for example, an RF signal in an uplink frequency band (about 791 to 821 MHz) of B20 among the LTE frequency bands designated to the FDD communication scheme. The BPF 312 may include a SAW filter configured to pass an RF signal in a downlink frequency band (about 832 to 862 MHz) of B20.

The filter 230 may be configured to have a characteristic of passing an RF signal in a frequency band including the first frequency band and the third frequency band.

The first switch 260 may further include a terminal (v) connected to the port (s) of the second duplexer 310. The first switch 260 may be configured to connect the antenna 210 to the terminal (m), the terminal (n), or the terminal (v).

The second switch 270 may further include a terminal (w) connected to the port (t) of the second duplexes 310. The second switch 270 may be configured to connect the output port (g) of the power amplification circuit 240 to the terminal (o), the terminal (p), or the terminal (w).

The RFIC 250 may be configured to convert the baseband signal received from the processor 120 through the first input port (h) into the RF signal in the first frequency band or the third frequency band, and output the RF signal to the power amplification circuit 240 through the first output port (i).

The RFIC 250 may further include an input port (x) connected to the port (u). The RFIC 250 may receive the RF signal in the first frequency band or the third frequency band through the input port (j), the RF signal in the second frequency band through the input port (k), or the RF signal in the fourth frequency band through the input port (x).

Figure 4:
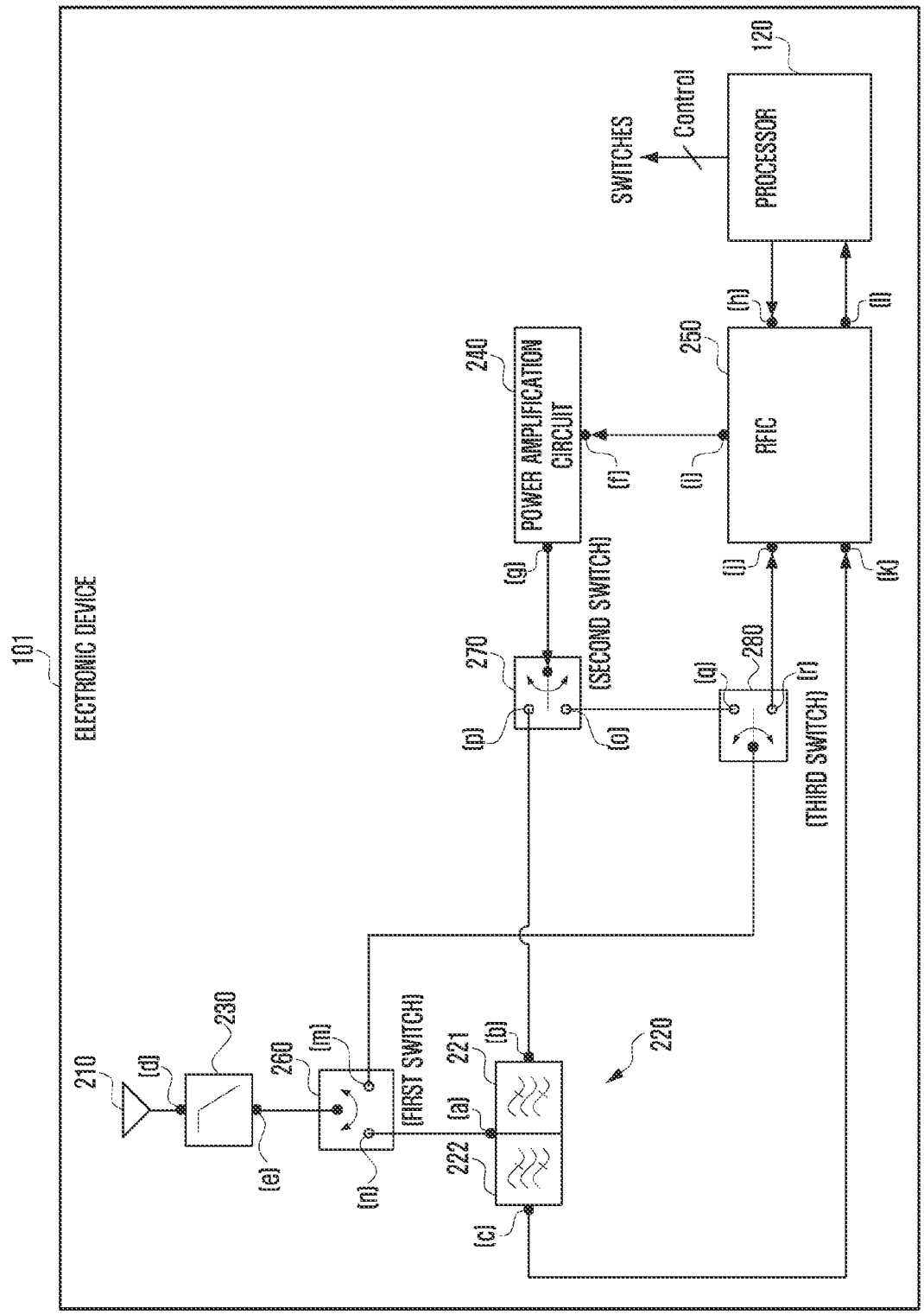
FIG. 4 illustrates an electronic device configured to support D2D communication, according to an embodiment.

FIG. 4 illustrates an electronic device configured to support D2D communication, according to an embodiment. For convenience of description, elements which overlap those in FIGS. 2 and 3 are omitted or briefly described.

Referring to FIG. 4, the filter 230 is disposed on a path connecting the antenna 210 and the first switch 260 rather than on the path connecting the first switch 260 and the third switch 280 (see FIG. 2). For example, the first port (d) of the filter 230 may be configured to be connected to the antenna 210, and the second port (e) may be configured to be connected to the first switch 260. Accordingly, the second port (e) of the filter 230 is connected to the terminal (m) or the terminal (n) of the first switch 260. The terminal (m) of the first switch 260 is connected to the terminal (q) or the terminal (r) of the third switch 280.

The processor 120 may control the switches 260, 270, and 280 to connect the second port (e) of the filter 230 to the terminal (m), the output port (g) of the power amplification circuit 240 to the terminal (o), and the terminal (m) to the terminal (q) on the basis of non-acquisition of network coverage information from the baseband signal received from the RFIC 250. In such a connected state (a D2D transmission mode), the processor 120 may output the baseband signal to the RFIC 250.

The processor 120 may switch the D2D communication mode from the transmission mode to the reception mode by maintaining the connection between the filter 230 and the terminal (m) but connecting the terminal (m) to the terminal (r).

The filter 230 of FIG. 3 may also be disposed on the path connecting the antenna 210 to the first switch 260 rather than on the path connecting the first switch 260 to the third switch 280.

Figure 5:
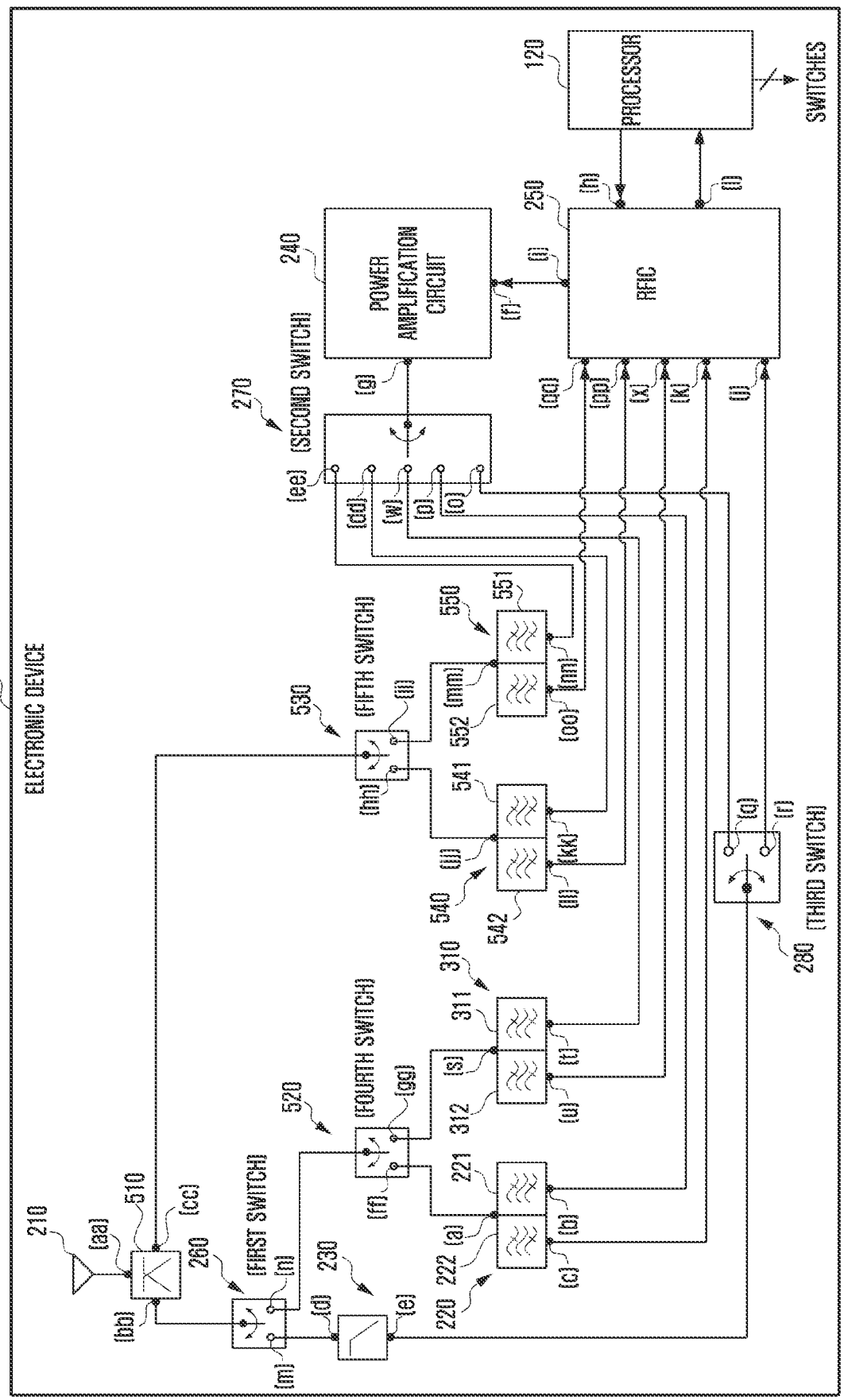
FIG. 5 illustrates an electronic device configured to support D2D communication, according to an embodiment.

FIG. 5 illustrates an electronic device configured to support D2D communication, according to an embodiment. For convenience of description, elements Which overlap those in FIGS. 2 and 3 are omitted or briefly described.

Referring to FIG. 5, the electronic device 101 includes the antenna 210, the first duplexer 220, the filter 230, the power amplification circuit 240, the processor 120, the RFIC 250, the first switch 260, the second switch 270, the third switch 280, the second duplexer 310, a diplexer 510, a fourth switch 520, a fifth switch 530, a third duplexer 240, and a fourth duplexer 550.

The diplexer 510 may include an LPF, an HPF, a first port (aa) configured between the LPF and the HPF, a second port (bb) connected to the LPF, and a third port (cc) connected to the HPF. The first port (aa) may be configured to be connected to the antenna 210, the second port (bb) may be configured to be connected to the first switch 260, and the third port (cc) may be configured to be connected to the fifth switch 530. The LPF may be configured to filter an RF signal having a low frequency band (a band including all of a first frequency band, a second frequency band, a third frequency band, a fourth frequency band, and a fifth frequency band, for example, equal to or lower than about 900 MHz) from the signal received through one of the first port (aa) and the second port (bb) and output the filtered signal to another port. The HPF may be configured to filter an RF signal having a high frequency band (for example, about 900 MHz or higher) from the signal received through one of the first port (aa) and the third port (cc) and output the filtered signal to another port.

The first switch 260 may be configured to connect the second port (bb) of the diplexer 510 to the terminal (m) or the terminal (n).

The second switch 270 may further include a terminal (dd) and a terminal (ee), and may be configured to connect the output port (g) of the power amplification circuit 240 to the terminal (o), the terminal (p), the terminal (w), the terminal (dd), or the terminal (cc).

The fourth switch 520 may include a terminal (ff) and a terminal (gg), and may be configured to connect the terminal (m) of the first switch 260 to the terminal (ff) or the terminal (gg). The terminal (ff) may be configured to be connected to the port (a) of the first duplexer 220. The terminal (gg) may be configured to be connected to the port (s) of the second duplexer 310.

The fifth switch 530 may include a terminal (hh) and a terminal (ii), and may be configured to connect the third port (cc) of the diplexer 510 to the terminal (hh) and the terminal (ii).

The third duplexer 540 may include a BPF 541 for passing the RF signal in the fifth frequency band, a BPF 542 for passing the RF signal in the sixth frequency band, a port (jj) configured between the BPF 541 and the BPF 542, a port (kk) connected to the BPF 541, and a port (ii) connected to the BPIF 542. The BPF 541 may be configured to filter the RF signal having the fifth frequency band from the signal received through one of the port (jj) and the port (kk) and output the filtered signal to another port. The BPF 542 may be configured to filter the RF signal having the sixth frequency band from the signal received through one of the port (jj) and the port (ll) and output the filtered signal to another port. The port (jj) may be configured to be connected to the terminal (hh) of the fifth switch 530, the port (kk) may be configured to be connected to the terminal (dd) of the second switch 270, and the port (ll) may be configured to be connected to the input port (pp) of the RFIC.

The fourth duplexer 550 may include a BPF 551 for passing the RF signal in the seventh frequency band, a BPF 552 for passing the RF signal in the eighth frequency band, a port (mm) configured between the BPF 551 and the BPF 552, a port (nn) connected to the BPF 551, and a port (oo) connected to the BPF 552. The BPF 551 may be configured to filter the RF signal having the seventh frequency band from the signal received through one of the port (mm) and the port (nn) and output the filtered signal to another port. The BPF 552 may be configured to filter the RF signal having the eighth frequency band from the signal received through one of the port (mm) and the port (oo) and output the filtered signal to another port. The port (mm) may be configured to be connected to the terminal (ii) of the fifth switch 530, the port (nn) may be configured to be connected to the terminal (ee) of the second switch 270, and the port (oo) may be configured to be connected to the input port (qq) of the RFIC.

The processor 120 may be configured to control the switches 260, 270, 280, 520, and 530. The processor 120 may control the switches 260, 270, and 280 to connect the second port (bb) of the diplexer 510 to the terminal (m), the second port (e) of the filter 230 to the terminal (q), and the output port (g) of the power amplification circuit 240 to the terminal (o) on the basis of non-acquisition of network coverage information from the baseband signal received from the RFIC 250. In such a connected state (a D2D transmission mode), the processor 120 may output the baseband signal to the RFIC 250.

The processor 120 may switch the D2D communication mode from the transmission mode to the reception mode by maintaining the connection between the second port (bb) and the terminal (m) but connecting the second port (e) of the filter 230 to the terminal (r).

The fourth switch 520 and one of the duplexers 220 and 310 may be omitted from the block diagram 500. For example, the fourth switch 520 and the second duplexer 310 may be omitted from the block diagram 500, the terminal (w) may be omitted from the second switch 270, and the input port (x) may be omitted from the RFIC 250, but the port (a) may be directly connected to the terminal (n).

The fifth switch 530 and one of the duplexers 540 and 550 may be omitted from the block diagram 500. For example, the fifth switch 530 and the fourth duplexer 550 may be omitted from the block diagram 500, the terminal (ee) may be omitted from the second switch 270, and the input port (qq) may be omitted from the RFIC 250, but the port (jj) may be directly connected to the third port (cc).

Figure 6:
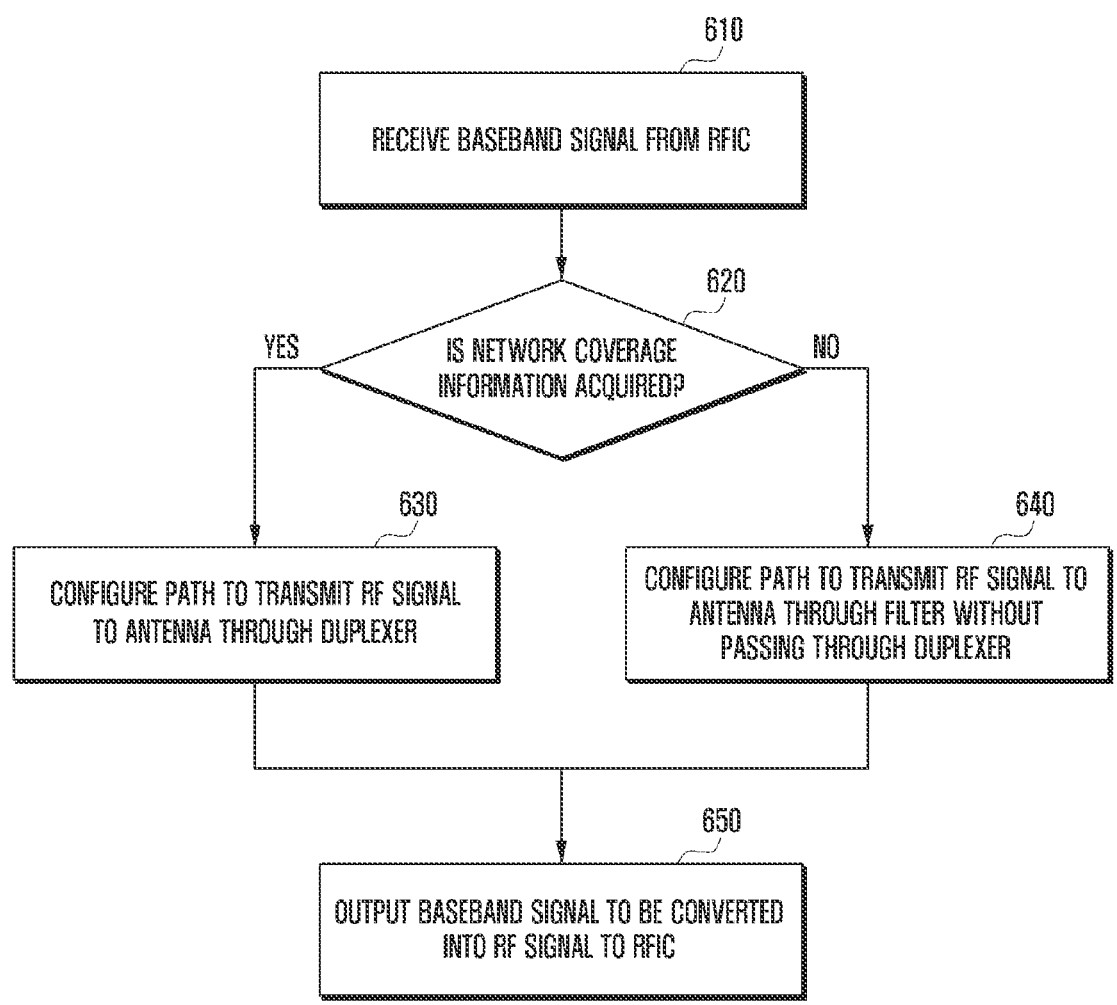
FIG. 6 illustrates operations for transmitting an RF signal by an electronic device, according to an embodiment.

FIG. 6 illustrates operations in which an electronic device transmits RF signals, according to an embodiment.

In operation 610, the processor 120 (e.g., an AP and/or a CP) receives a baseband signal from the RFIC 250.

Referring again to FIG. 2 or 3, for example, the RFIC 250 may transmit and receive the RF signal through the second output port (i) and the second input port (k) in the state in which the antenna 210 is connected to the terminal (n) and the output port (g) is connected to the terminal (p). Alternatively, the RFIC 250 may transmit and receive the RF signal through the second output port (i) and the second input port (x) in the state in which the antenna 210 is connected to the terminal (v) and the output port (g) is connected to the terminal (w). The RFIC 250 may convert the RF signal received through at least one of the second input port (k) or the second input port (x) into the baseband signal and output the baseband signal to the processor 120 through the first output port (l).

Referring again to FIG. 4, in another example, the RFIC 250 may transmit and receive the RF signal through the second output port (i) and the second input port (k) in the state in which the second port (e) is connected to the terminal (n) and the output port (g) is connected to the terminal (p). The RFIC 250 may convert the RF signal received through the second input port (k) into the baseband signal and output the baseband signal to the processor 120 through the first output port (l).

Referring again to FIG. 5, in another example, the RFIC 250 may transmit and receive the RF signal through the second output port (i) and the second input port (k) in the state in which the second port (bb) is connected to the terminal (n), the output port (g) of the power amplification circuit 240 is connected to the terminal (p), and the terminal (n) is connected to the terminal (ff). Alternatively, the RFIC 250 may transmit and receive the RF signal through the second output port (i) and the second input port (x) in the state in which the second port (bb) is connected to the terminal (n), the output port (g) of the power amplification circuit 240 is connected to the terminal (w), and the terminal (n) is connected to the terminal (gg). The RFIC 250 may convert the RF signal received through the second input port (k) or the second input port (x) into the baseband signal and output the baseband signal to the processor 120 through the first output port (l).

Referring again to FIG. 6, in operation 620, the processor 120 attempts acquisition of network coverage information from the received baseband signal.

When the acquisition is successful (Yes in operation 620), the processor 120 configures an RF signal path to transmit the RF signal to the antenna 210 through the duplexer in operation 630. For example, the processor 120 may maintain the connected state when the baseband signal is received from the RFIC 250.

When the acquisition has failed (No of operation 620), the processor 120 configures an RF signal path to transmit the RF signal to the antenna 210 through the filter 230 without passing through the duplexer (for example, the first duplexer 220 or the second duplexer 310) in operation 640.

Referring again to FIG. 2 or 3, for example, the processor 120 may control the switches 260, 270, and 280 to connect the antenna 210 to the terminal (m), the output port (g) to the terminal (o), and the second port (e) of the filter 230 to the terminal (q).

Referring again to FIG. 4, in another example, the processor 120 may control the switches 260, 270, and 280 to connect the second port (e) to the terminal (m), the output port (g) to the terminal (o), and the terminal (m) to the terminal (q).

Referring again to FIG. 5, in another example, the processor 120 may control the switches 260, 270, and 280 to connect the second port (bb) to the terminal (m), the second port (e) to the terminal (q), and the output port (g) to the terminal (o).

Referring again to FIG. 6, after configuring the RF signal path, the processor 120 outputs the baseband signal to be converted into the RF signal to the RFIC 250 in operation 650.

In accordance with an embodiment of the disclosure, an electronic device may include an antenna, a first duplexer comprising a first BPF configured to pass an RF signal having a frequency band belonging to a first frequency band, a second BPF configured to pass an RF signal having a frequency band belonging to a second frequency band, a first port configured between the first BPF of the first duplexer and the second BPF of the first duplexer, a second port connected to the first BPF of the first duplexer, and a third port connected to the second BPF of the first duplexer, a filter configured to pass an RF signal in a frequency band including a frequency band of an RF signal passing through at least one of the first BPF of the first duplexer or the second BPF of the first duplexer, a power amplification circuit comprising an input port configured to receive an RF signal and an output port configured to output an amplified RF signal; a processor; an RFIC comprising an input port configured to convert a baseband signal received from the processor into an RF signal, convert an RF signal received through the antenna into a baseband signal, and receive an RF signal, and an output port configured to output an RF signal; a first switch comprising a first terminal connected to a first port of the filter and a second terminal connected to the first port of the first duplexer and configured to connect the antenna to the first terminal of the first switch or the second terminal of the first switch; a second switch comprising a first terminal and a second terminal connected to the second port of the first duplexer and configured to connect the output port of the power amplification circuit to the first terminal of the second switch or the second terminal of the second switch; and a third switch comprising a first terminal connected to the first terminal of the second switch and a second terminal connected to the input port of the RFIC and configured to connect the second port of the filter to the first terminal of the third switch or the second terminal of the third switch, wherein the processor is configured to connect the antenna to the first terminal of the first switch, the output port of the power amplification circuit to the first terminal of the second switch, and the second port of the filter to the first terminal of the third switch by controlling the first switch, the second switch, and the third switch, and output a baseband signal to the RFIC in a state in which the antenna is connected to the first terminal of the first switch, the output port of the power amplification circuit is connected to the first terminal of the second switch, and the second port of the filter is connected to the first terminal of the third switch.

The filter may include an inductor and a capacitor having a characteristic of passing the RF signal in the first frequency band.

The first frequency band may be an LTE frequency band designated to an FDD communication scheme.

The electronic device may further include a second duplexer comprising a first BPF configured to pass an RF signal having a frequency band belonging to a third frequency band, a second BPF configured to pass an RF signal having a frequency band belonging to a fourth frequency band, a first port configured between the first BPF of the second duplexer and the second BPF of the second duplexer, a second port connected to the first BPF of the second duplexer, and a third port connected to the second BPF of the second duplexer, wherein the first switch further comprises a third terminal connected to the first port of the second duplexer and is configured to connect the antenna to the first terminal of the first switch, the second terminal of the first switch, or the third terminal of the first switch, and the second switch further comprises a third terminal connected to the second port of the second duplexer and is configured to connect the output port of the power amplification circuit to the first terminal of the second switch, the second terminal of the second switch, or the third terminal of the second switch.

The filter may be configured to pass an RF signal in a frequency band including a frequency band of an RF signal passing through at least one of the first BPF of the second duplexer or the second BPF of the second duplexer.

The filter may include an inductor and a capacitor having a characteristic of passing RF signals in the first frequency band and the third frequency band.

One of the first frequency band and the third frequency band may be an uplink band of B20 among LTE frequency bands, and the other one may be an uplink band of B28.

The processor may be configured to connect the antenna to the second terminal of the first switch and the output port of the power amplification circuit to the second terminal of the second switch by controlling the first switch and the second switch when acquisition of network coverage from the baseband signal received from the RFIC is successful, and connect the antenna to the first terminal of the first switch, the output port of the power amplification circuit to the first terminal of the second switch, and the second port of the filter to the first terminal of the third switch by controlling the first switch, the second switch, and the third switch when the acquisition of the network coverage information from the baseband signal received from the RFIC has failed.

The second switch and the power amplification circuit may be configured as a single module.

In accordance with an embodiment of the disclosure, an electronic device may include a first duplexer comprising a first BPF configured to pass an RF signal having a frequency band belonging to a first frequency band, a second BPF configured to pass an RF signal having a frequency band belonging to a second frequency band, a first port configured between the first BPF of the first duplexer and the second BPF of the first duplexer, a second port connected to the first BPF of the first duplexer, and a third port connected to the second BPF of the first duplexer; a filter configured to pass an RF signal in a frequency band including a frequency band of an RF signal passing through at least one of the first BPF of the first duplexer or the second BPF of the first duplexer; an antenna connected to a first port of the filter; a power amplification circuit comprising an input port configured to receive an RF signal and an output port configured to output an amplified RF signal; a processor; an RFIC comprising an input port configured to convert a baseband signal received from the processor into an RF signal, convert an RF signal received through the antenna into a baseband signal, and receive an RF signal, and an output port configured to output an RF signal; a first switch comprising a first terminal and a second terminal connected to the first port of the first duplexer and configured to connect a second port of the filter to the first terminal of the first switch or the second terminal of the first switch; second switch comprising a first terminal and a second terminal connected to the second port of the first duplexer and configured to connect the output port of the power amplification circuit to the first terminal of the second switch or the second terminal of the second switch; and a third switch comprising a first terminal connected to the first terminal of the second switch and a second terminal connected to the input port of the RFIC and configured to connect the first terminal of the first switch to the first terminal of the third switch or the second terminal of the third switch, wherein the processor is configured to connect the second port of the filter to the first terminal of the first switch, the output port of the power amplification circuit to the first terminal of the second switch, and the first terminal of the first switch to the first terminal of the third switch by controlling the first switch, the second switch, and the third switch, and output a baseband signal to the RFIC in a state in which the second port of the filter is connected to the first terminal of the first switch, the output port of the power amplification circuit is connected to the first terminal of the second switch, and the first terminal of the first switch is connected to the first terminal of the third switch.

In accordance with an embodiment of the disclosure, an electronic device may include a diplexer comprising an LPF, an HPF, a first port configured between the LPF and the HPF, a second port connected to the LPF, and a third port connected to the HPF; an antenna connected to the first port of the diplexer; a filter configured to pass an RF signal in a frequency band including a frequency band of an RF signal passing through the LPF; a first duplexer comprising a first BPF configured to pass an RF signal having a frequency band belonging to a first frequency band, a second BPF configured to pass an RF signal having a frequency band belonging to a second frequency band, a first port configured between the first BPF of the first duplexer and the second BPF of the first duplexer, a second port connected to the first BPF of the first duplexer, and a third port connected to the second BPF of the first duplexer; a power amplification circuit comprising an input port configured to receive an RF signal and an output port configured to output an amplified RF signal; a processor; an RFIC comprising an input port configured to convert a baseband signal received from the processor into an RF signal, convert an RF signal received through the antenna into a baseband signal, and receive an RF signal, and an output port configured to output an RF signal; a first switch comprising a first terminal connected to a first port of the filter and a second terminal connected to the first port of the first duplexer and configured to connect the second port of the diplexer to the first terminal of the first switch or the second terminal of the first switch; a second switch comprising a first terminal and a second terminal connected to the second port of the first duplexer and configured to connect the output port of the power amplification circuit to the first terminal of the second switch or the second terminal of the second switch; and a third switch comprising a first terminal connected to the first terminal of the second switch and a second terminal connected to the input port of the RFIC and configured to connect a second port of the filter to the first terminal of the third switch or the second terminal of the third switch, wherein the processor is configured to connect the second port of the diplexer to the first terminal of the first switch, the second port of the filter to the first terminal of the third switch, and the output port of the power amplification circuit to the first terminal of the second. switch by controlling the first switch, the second switch, and the third switch, and output a baseband signal to the RFIC in a state in which the second port of the diplexer is connected to the first terminal of the first switch, the second port of the filter is connected to the first terminal of the third switch, and the output port of the power amplification circuit is connected to the first terminal of the second switch.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

The invention claimed is:

1. An electronic device, comprising:
   an antenna;
   a first duplexer including a first band pass filter (BPF) configured to pass a radio frequency (RF) signal having a frequency band belonging to a first frequency band, a second BPF configured to pass an RF signal having a frequency band belonging to a second frequency band, a first port configured between the first BPF of the first duplexer and the second BPF of the first duplexer, a second port connected to the first BPF of the first duplexer, and a third port connected to the second BPF of the first duplexer;

a filter configured to pass an RF signal in a frequency band including a frequency band of an RF signal passing through at least one of the first BPF of the first duplexer or the second BPF of the first duplexer;

a power amplification circuit including an input port configured to receive an RF signal and an output port configured to output an amplified RF signal;

a processor;

an RF integrated circuit (RFIC) including an input port configured to convert a baseband signal received from the processor into an RF signal, convert an RF signal received through the antenna into a baseband signal, and receive an RF signal, and an output port configured to output an RF signal;

a first switch including a first terminal connected to a first port of the filter and a second terminal connected to the first port of the first duplexer and configured to connect the antenna to the first terminal of the first switch or the second terminal of the first switch;

a second switch including a first terminal and a second terminal connected to the second port of the first duplexer and configured to connect the output port of the power amplification circuit to the first terminal of the second switch or the second terminal of the second switch; and a third switch including a first terminal connected to the first terminal of the second switch and a second terminal connected to the input port of the RFIC and configured to connect the second port of the filter to the first terminal of the third switch or the second terminal of the third switch, wherein the processor is configured to connect the antenna to the first terminal of the first switch, the output port of the power amplification circuit to the first terminal of the second switch, and the second port of the filter to the first terminal of the third switch by controlling the first switch, the second switch, and the third switch, and output a baseband signal to the RFIC in a state in which the antenna is connected to the first terminal of the first switch, the output port of the power amplification circuit is connected to the first terminal of the second switch, and the second port of the filter is connected to the first terminal of the third switch.

2. The electronic device of claim 1, wherein the filter includes an inductor and a capacitor having a characteristic of passing the RF signal in the first frequency band.

3. The electronic device of claim 2, wherein the first frequency band is a long term evolution (LTE) frequency band designated to a frequency division duplexing (FDD) communication scheme.

4. The electronic device of claim 1, further comprising a second duplexer, wherein the second duplexer comprises:

a first BPF configured to pass an RF signal having a frequency band belonging to a third frequency band;

a second BPF configured to pass an RF signal having a frequency band belonging to a fourth frequency band;

a first port configured between the first BPF of the second duplexer and the second BPF of the second duplexer;

a second port connected to the first BPF of the second duplexer; and a third port connected to the second BPF of the second duplexer, wherein the first switch further includes a third terminal connected to the first port of the second duplexer and is configured to connect the antenna to the first terminal of the first switch, the second terminal of the first switch, or the third terminal of the first switch, and wherein the second switch further includes a third terminal connected to the second port of the second duplexer and is configured to connect the output port of the power amplification circuit to the first terminal of the second switch, the second terminal of the second switch, or the third terminal of the second switch.

5. The electronic device of claim 4, wherein the filter is configured to pass an RF signal in a frequency band including a frequency band of an RF signal passing through at least one of the first BPF of the second duplexer or the second BPF of the second duplexer.

6. The electronic device of claim 5, wherein the filter includes an inductor and a capacitor having a characteristic of passing RF signals in the first frequency band and the third frequency band.

7. The electronic device of claim 6, wherein one of the first frequency band and the third frequency band is an uplink band of B20 among long term evolution (LTE) frequency bands, and the other one is an uplink band of B28.

8. The electronic device of claim 1, wherein the processor is further configured to connect the antenna to the second terminal of the first switch and the output port of the power amplification circuit to the second terminal of the second switch by controlling the first switch and the second switch when acquisition of network coverage from the baseband signal received from the RFIC is successful, and connect the antenna to the first terminal of the first switch, the output port of the power amplification circuit to the first terminal of the second switch, and the second port of the filter to the first terminal of the third switch by controlling the first switch, the second switch, and the third switch when the acquisition of the network coverage information from the baseband signal received from the RFIC has failed.

9. The electronic device of claim 1, wherein the second switch and the power amplification circuit are configured as a single module.

10. An electronic device, comprising:

a first duplexer including a first band pass filter (BPF) configured to pass a radio frequency (RF) signal having a frequency band belonging to a first frequency band, a second BPF configured to pass an RF signal having a frequency band belonging to a second frequency band, a first port configured between the first BPF of the first duplexer and the second BPF of the first duplexer, a second port connected to the first BPF of the first duplexer, and a third port connected to the second BPF of the first duplexer;

a filter configured to pass an RF signal in a frequency band including a frequency band of an RF signal passing through at least one of the first BPF of the first duplexer or the second BPF of the first duplexer;

an antenna connected to a first port of the filter;

a power amplification circuit including an input port configured to receive an RF signal and an output port configured to output an amplified RF signal;

a processor;

an RF integrated circuit (RFIC) including an input port configured to convert a baseband signal received from the processor into an RF signal, convert an RF signal received through the antenna into a baseband signal, and receive an RF signal, and an output port configured to output an RF signal;
a first switch including a first terminal and a second terminal connected to the first port of the first duplexer and configured to connect a second port of the filter to the first terminal of the first switch or the second terminal of the first switch;
second switch comprising a first terminal and a second terminal connected to the second port of the first duplexer and configured to connect the output port of the power amplification circuit to the first terminal of the second switch or the second terminal of the second switch; and
a third switch including a first terminal connected to the first terminal of the second switch and a second terminal connected to the input port of the RFIC and configured to connect the first terminal of the first switch to the first terminal of the third switch or the second terminal of the third switch,
wherein the processor is configured to connect the second port of the filter to the first terminal of the first switch, the output port of the power amplification circuit to the first terminal of the second switch, and the first terminal of the first switch to the first terminal of the third switch by controlling the first switch, the second switch, and the third switch, and output a baseband signal to the RFIC in a state in which the second port of the filter is connected to the first terminal of the first switch, the output port of the power amplification circuit is connected to the first terminal of the second switch, and the first terminal of the first switch is connected to the first terminal of the third switch.

11. The electronic device of claim 10, wherein the filter includes an inductor and a capacitor having a characteristic of passing the RF signal in the first frequency band.

12. The electronic device of claim 11, wherein the first frequency band is a long term evolution (LTE) frequency band designated to a frequency division duplexing (FDD) communication scheme.

13. The electronic device of claim 10, wherein the processor is further configured to connect the second port of the filter to the second terminal of the first switch and the output port of the power amplification circuit to the second terminal of the second switch by controlling the first switch and the second switch when acquisition of network coverage information from the baseband signal received from the RFIC is successful, and connect the second port of the filter to the first terminal of the first switch, output port of the power amplification circuit to the first terminal of the second switch, and the first terminal of the first switch to the first terminal of the third switch by controlling the first switch, the second switch, and the third switch when the acquisition of the network coverage information from the baseband signal received from the RFIC has failed.

14. An electronic device, comprising:
a diplexer including a low pass filter (LPF), a high pass filter (HPF), a first port configured between the LPF and the HPF, a second port connected to the LPF, and a third port connected to the HPF;
an antenna connected to the first port of the diplexer;
a filter configured to pass a radio frequency (RF) signal in a frequency band including a frequency band of an RF signal passing through the LPF;
a first duplexer including a first band pass filter (BPF) configured to pass an RF signal having a frequency band belonging to a first frequency band, a second BPF configured to pass an RF signal having a frequency band belonging to a second frequency band, a first port configured between the first BPF of the first duplexer and the second BPF of the first duplexer, a second port connected to the first BPF of the first duplexer, and a third port connected to the second BPF of the first duplexer;
a power amplification circuit including an input port configured to receive an RF signal and an output port configured to output an amplified RF signal;
a processor;
an RF integrated circuit (RFIC) including an input port configured to convert a baseband signal received from the processor into an RF signal, convert an RF signal received through the antenna into a baseband signal, and receive an RF signal, and an output port configured to output an RF signal;
a first switch including a first terminal connected to a first port of the filter and a second terminal connected to the first port of the first duplexer and configured to connect the second port of the diplexer to the first terminal of the first switch or the second terminal of the first switch;
a second switch including a first terminal and a second terminal connected to the second port of the first duplexer and configured to connect the output port of the power amplification circuit to the first terminal of the second switch or the second terminal of the second switch; and
a third switch including a first terminal connected to the first terminal of the second switch and a second terminal connected to the input port of the RFIC and configured to connect a second port of the filter to the first terminal of the third switch or the second terminal of the third switch,
wherein the processor is configured to connect the second port of the diplexer to the first terminal of the first switch, the second port of the filter to the first terminal of the third switch, and the output port of the power amplification circuit to the first terminal of the second switch by controlling the first switch, the second switch, and the third switch, and output a baseband signal to the RFIC in a state in which the second port of the diplexer is connected to the first terminal of the first switch, the second port of the filter is connected to the first terminal of the third switch, and the output port of the power amplification circuit is connected to the first terminal of the second switch.

15. The electronic device of claim 14, wherein the filter includes an inductor and a capacitor having a characteristic of passing the RF signal in the first frequency band.

16. The electronic device of claim 15, wherein the first frequency band is a long term evolution (LTE) frequency band designated to a frequency division duplexing (FDD) communication scheme.

17. The electronic device of claim 14, further comprising:
a second duplexer comprising a first BPF configured to pass an RF signal having a frequency band belonging to a third frequency band;
a second BPF configured to pass an RF signal having a frequency band belonging to a fourth frequency band;
a first port configured between the first BPF of the second duplexer and the second BPF of the second duplexer;
a second port connected to the first BPF of the second duplexer; and
a third port connected to the second BPF of the second duplexer, wherein the first switch further includes a third terminal connected to the first port of the second duplexer and is configured to connect the antenna to the first terminal of the first switch, the second terminal of the first switch, or the third terminal of the first switch, and wherein the second switch further includes a third terminal connected to the second port of the second duplexer and is configured to connect the output port of the power amplification circuit to the first terminal of the second switch, the second terminal of the second switch, or the third terminal of the second switch.

18. The electronic device of claim 17, wherein the filter is configured to pass an RF signal in a frequency band including a frequency band of an RF signal passing through at least one of the first BPF of the second duplexer or the second BPF of the second duplexer.

19. The electronic device of claim 18, wherein the filter includes an inductor and a capacitor having a characteristic of passing RF signals in the first frequency band and the third frequency band.

20. The electronic device of claim 19, wherein one of the first frequency band and the third frequency band is an uplink band of B20 among long term evolution (LTE) frequency bands, and the other one is an uplink band of B28.

* * * * *